US005965243A

United States Patent [19]

Butler et al.

[11] Patent Number: 5,965,243

[45] Date of Patent: Oct. 12, 1999

[54] ELECTROSTATIC RECEPTORS HAVING RELEASE LAYERS WITH TEXTURE AND MEANS FOR PROVIDING SUCH RECEPTORS

[75] Inventors: Terri L. Butler; Kathryn R. Bretscher, both of Minneapolis; Mark C. Berens, Oakdale, all of Minn.; James A. Baker, Hudson, Wis.; Gaye K. Lehman, Lauderdale, Minn.

[73] Assignee: 3M Innovative Properties Company, St. Paul, Minn.

[21] Appl. No.: 08/828,823

[22] Filed: Apr. 4, 1997

[51] Int. Cl.[6] .......... B32B 9/00

[52] U.S. Cl. .......... 428/195; 428/201; 428/204; 428/209; 428/323; 428/343; 428/409; 428/432; 428/433; 428/470; 428/500; 428/913; 430/47; 430/124; 430/126

[58] Field of Search .......... 428/201, 204, 428/209, 323, 343, 432, 500, 195, 913, 470, 433, 409; 430/47, 124, 126

[56] References Cited

U.S. PATENT DOCUMENTS

| | | | |
|---|---|---|---|
| 3,159,662 | 12/1964 | Ashby | 260/448.2 |
| 3,220,972 | 11/1965 | Lamoreaux | 260/46.5 |
| 3,383,209 | 5/1968 | Cassiers et al. | 96/1.3 |
| 3,410,886 | 11/1968 | Joy | 260/448.2 |
| 4,431,764 | 2/1984 | Yoshizumi | 524/409 |
| 4,439,509 | 3/1984 | Schank | 430/132 |
| 4,510,094 | 4/1985 | Drahnak | 260/429 CY |
| 4,551,406 | 11/1985 | Schaedlich et al. | 430/119 |
| 4,565,760 | 1/1986 | Schank | 430/66 |
| 4,595,602 | 6/1986 | Schank | 427/76 |
| 4,600,484 | 7/1986 | Drahnak | 204/157.74 |
| 4,606,934 | 8/1986 | Lee et al. | 427/76 |
| 4,609,574 | 9/1986 | Keryk et al. | 427/407.1 |
| 4,657,419 | 4/1987 | Takakawa | 400/490 |
| 4,764,448 | 8/1988 | Yoshitomi et al. | 430/120 |
| 4,774,111 | 9/1988 | Lo | 427/387 |
| 4,804,607 | 2/1989 | Atsumi | 430/67 |
| 4,850,838 | 7/1989 | Wagner et al. | 425/101 |
| 4,923,775 | 5/1990 | Schank | 430/59 |
| 4,933,247 | 6/1990 | Osawa et al. | 430/66 |
| 4,965,137 | 10/1990 | Ruf | 428/432 |
| 5,036,117 | 7/1991 | Chung et al. | 522/172 |
| 5,045,391 | 9/1991 | Brandt et al. | 428/336 |
| 5,061,535 | 10/1991 | Kreckel et al. | 428/42 |
| 5,071,728 | 12/1991 | Watts | 430/126 |
| 5,099,256 | 3/1992 | Anderson | 346/1.1 |
| 5,106,710 | 4/1992 | Wang et al. | 430/42 |
| 5,108,865 | 4/1992 | Zwaldo et al. | 430/126 |
| 5,114,520 | 5/1992 | Wang, Jr. et al. | 156/240 |
| 5,162,183 | 11/1992 | Lindblad et al. | 430/59 |
| 5,166,023 | 11/1992 | Harada et al. | 430/62 |
| 5,187,039 | 2/1993 | Meyer | 430/126 |
| 5,192,613 | 3/1993 | Work, III et al. | 428/363 |
| 5,212,048 | 5/1993 | Lewis et al. | 430/272 |
| 5,213,928 | 5/1993 | Yu et al. | 430/66 |
| 5,242,776 | 9/1993 | Doi et al. | 430/67 |
| 5,262,259 | 11/1993 | Chou et al. | 430/47 |
| 5,264,291 | 11/1993 | Shinozaki | 428/513 |
| 5,269,970 | 12/1993 | Ruf et al. | 252/518 |
| 5,363,179 | 11/1994 | Cahill et al. | 355/278 |
| 5,397,634 | 3/1995 | Cahill et al. | 428/304.4 |
| 5,400,126 | 3/1995 | Cahill et al. | 355/278 |
| 5,414,502 | 5/1995 | Cahill et al. | 355/278 |
| 5,468,815 | 11/1995 | Boardman et al. | 525/478 |
| 5,483,321 | 1/1996 | Cahill et al. | 355/200 |
| 5,520,978 | 5/1996 | Boardman et al. | 428/41.9 |
| 5,601,959 | 2/1997 | Brault | 430/126 |
| 5,736,228 | 4/1998 | Morris et al. | 428/195 |

FOREIGN PATENT DOCUMENTS

| | | |
|---|---|---|
| 0 444 870 A2 | 4/1991 | European Pat. Off. . |
| 0 559 575 A1 | 8/1993 | European Pat. Off. . |
| 1 520 898 | 8/1978 | United Kingdom . |
| 1 528 458 | 10/1978 | United Kingdom . |
| WO 96/23595 | 8/1996 | WIPO . |
| WO 96/34318 | 10/1996 | WIPO . |

OTHER PUBLICATIONS

JAPIO Abstract of Japanese Kokai 2–201450 (1990).
JAPIO Abstract of Japanese Kokai 2–139564 (1990).
JAPIO Abstract of Japanese Kokai 3–071146 (1991).
JAPIO Abstract of Japanese Kokai 3–188452 (1991).
JAPIO Abstract of Japanese Kokai 4–122945 (1992).
JAPIO Abstract of Japanese Kokai 4–120551 (1992).
JAPIO Abstract of Japanese Kokai 4–304460 (1992).
JAPIO Abstract of Japanese Kokai 4–346356 (1992).
JAPIO Abstract of Japanese Kokai 5–307267 (1993).
JAPIO Abstract of Japanese Kokai 5–265243 (1993).
JAPIO Abstract of Japanese Kokai 8–076388 (1996).
INPADCO Abstract of Japanese Kokai 6–89036 (1994).
Yilgor et al. "Polysiloxane Containing Copolymers:A Survey Of Recent Developments)" *Advanced in Polymer Science* 86 (1988).
E.Cohen & E.Gutoff *Modern Coating & Drying Technology* VCH Press,NY,pp. 78–95, 134–141; 162–163.
TAPPI Test T 538 om–96 (TAPPI, 1996).
Smith *The Analytical Chemistry of Silicones* pp. 135,158–161 (1991).

*Primary Examiner*—Timothy Speer
*Assistant Examiner*—Abraham Bahta
*Attorney, Agent, or Firm*—Dale A. Bjorkman

[57] ABSTRACT

The invention is textured surface release layers for dielectric substrates used in liquid electrostatic imaging processes. The invention also includes means of providing textured release surfaces for dielectric substrates, and a method of liquid electrostatic imaging using textured dielectric substrates.

6 Claims, No Drawings

ELECTROSTATIC RECEPTORS HAVING RELEASE LAYERS WITH TEXTURE AND MEANS FOR PROVIDING SUCH RECEPTORS

RELATED APPLICATIONS

This application is related to U.S. patent application Ser. No. 08/724,073 by virtue of common assignee, similar subject matter, and some common inventors. This application is also related to copending, concurrently filed, U.S. patent application Ser. Nos. 08/833,169; 08/832,834; 08/832,934; and 08/826,571, by virtue of common assignee, similar subject matter, and some common inventors.

FIELD OF INVENTION

The present invention relates to dielectric substrates for electrostatic imaging. More specifically this invention relates to release layers for dielectric substrates having texture and a method for making such dielectric substrates.

BACKGROUND OF INVENTION

Deficiencies with temporary imaging receptors used in liquid ink imaging processes, particularly liquid electrostatic printing, are known to exist. In electrostatic printing, an electrostatic image is formed by (1) placing a charge onto the surface of a dielectric element (either a temporary image receptor or the final receiving substrate) in selected areas of the element with an electrostatic writing stylus or its equivalent to form a charge image, (2) applying toner to the charge image, (3) drying or fixing the toned image on the dielectric, and optionally (4) transferring the fixed toned image from the temporary image receptor to a permanent receptor. An example of a liquid electrostatic imaging process which makes use of all four steps is described in U.S. Pat. No. 5,262,259. Suitable surface release layers useful in such electrostatic imaging processes are described in European Patent Application 444,870 A2 and U.S. Pat. Nos. 5,045,391 and 5,264,291

The surface of the dielectric element is typically chosen to be a release layer such as silicone, fluorosilicone or fluorosilicone copolymer,. The release layer should be durable and resistant to abrasion. The release layer should also resist chemical attack or excessive swelling by the toner carrier fluid. The release layer should also not significantly interfere with the charge dissipation characteristics of the dielectric construction. It will be understood by those skilled in the art that other properties could be important to durable release performance in liquid electrostatic printing other than those described herein.

One common problem that arises during electrostatic imaging is the phenomenon of carrier liquid beading on the temporary image receptor. Since electrostatic imaging processes typically make use of non-optical means (e.g. an electrostatic stylus or an array of styli) to generate the latent electrostatic image on the surface release layer of the dielectric element, such carrier liquid beading does not generally cause problems of image degradation in multicolor imaging processes due to diffraction of an exposing radiation source as occurs in liquid electrophotographic imaging. However, carrier liquid beading can still degrade image quality by causing the wet toned image to diffusionally broaden or flow, with adverse effects on image resolution. Such image degradation is commonly referred to in the art as "bleeding" of the image.

Another problem which arises in multicolor liquid electrostatic imaging relates to removal of a portion of one color toner layer during the application of a second color toner layer due to contact of the first, still wet toner layer with the electrostatic styli. This phenomenon is commonly referred to in the art as "head scraping."

Yet another problem which arises in multicolor liquid electrostatic printing processes, particularly as described in U.S. Pat. No. 5,262,259, relates to the final transfer step of the fixed toned image from the temporary image receptor to a permanent receptor. This transfer process is commonly carried out using heat and/or pressure. This transfer process is inherently slow, and its speed is limited by the rate at which heat can be transferred through the temporary image receptor and by the upper limit of pressure which can be applied during the transfer step. If the applied heat and/or pressure are not correctly selected, or the transfer speed is too high, poor image transfer can result. Poor image transfer may be manifested by low transfer efficiency and incompletely or partially transferred images. Low transfer efficiency results in images that are light and/or speckled.

SUMMARY OF INVENTION

Therefore, there is a need for release layers which control the liquid on the surface of the dielectric receptor and minimize the beading effect. There is also a need for surface release layers which permit virtually 100% image transfer from the temporary image receptor (i.e. dielectric element) to a permanent receptor. There is also a need for surface release layers which permit image transfer from the temporary image receptor to the permanent receptor at higher transfer speeds and at lower temperatures and/or pressures.

This invention provides excellent imaging performance in liquid electrostatic systems by utilization of dielectric substrates having release surfaces having texture.

Specifically, according to one embodiment the invention relates to release surfaces for dielectric substrates in which the texture is non-random. Preferably, the texture can be substantially directionalized in the image processing direction to provide improved imaging performance. The dielectric layer is not exposed but rather is completely covered by the release layer, i.e. the release layer is continuous.

Therefore, according to one embodiment, this invention is a dielectric substrate comprising an electroconductive substrate, a dielectric layer, an optional barrier layer and a release layer having a texture. The texture is directionalized as described above. The release layer completely covers the underlying layer.

According to a second embodiment, this invention is an electrostatic system comprising a dielectric substrate; a charge producing means for producing an image-wise distribution of charges on the dielectric substrate; a liquid toner comprising toner particles in a carrier liquid; and an application means for applying the liquid toner to the dielectric substrate forming an image-wise distribution of the toner particles on the dielectric substrate to form the image; wherein, the dielectric substrate moves in an image process direction and comprises a dielectric layer and a release layer having a texture, optionally directionalized in the image process direction. The system may or may not include a drying means.

According to a third embodiment, this invention is a method of making a dielectric substrate having a textured release layer comprising a method selected from use of textured substrates, texturing during the process of coating the surface release layer, texture generation on the uncured release surface immediately following the coating process, texture generation during the release surface curing process, texturing of the cured release surface after the curing process, and texture generation on the underlying dielectric substrate prior to coating the surface release layer. Some specific methods include abrading, buffing, scribing, embossing, die coating, carrier fluid process coating, and gravure coating.

According to a fourth embodiment, this invention is a method of making a textured dielectric substrate comprising the steps providing a dielectric substrate element comprising an electroconductive substrate and a dielectric layer, applying a textured release layer which completely covers the surface of the dielectric substrate to the dielectric substrate element by a non-levelled coating process. According to this embodiment the texture need not be random. Examples of preferred non-leveled coating processes include gravure coating, carrier fluid coating, die coating, flexographic printing, and Langmuir-Blodgett bath coating. Gravure coating is especially preferred.

It will be understood by those skilled in the art that the rheology of the surface release formulation, its relative hydrophilicity, surface tension, etc. may influence the release surface patterns and their performance by the physical modification processes outlined here.

Further features and advantages of the invention are described in the following Embodiments and Examples.

EMBODIMENTS OF THE INVENTION

Electrostatic Systems

The textured dielectric substrates of this invention may be used in any known electrostatic system but are particularly useful in those single pass and multiple pass electrostatic printers or plotters commercially available from a number of companies, including Minnesota Mining and Manufacturing Company of St. Paul, Minn., USA; Nippon Steel Corporation of Tokyo, Japan; Xerox Corporation of Rochester, N.Y., USA; and Raster Graphics of San Jose, Calif., USA and otherwise discussed in the literature such as in U.S. Pat. No. 5,262,259, the disclosure of which is incorporated herein by reference. Particularly preferred printers are the Scotchprint™ brand electrostatic printers from 3M, and particularly the Scotchprint™ 2000 printer because of its speed and width of printing.

Substrates

Substrates can be any dielectric paper or film and preferably a durable material that resists any swelling or other loss of continuity when coated with the conductive layer. Any materials disclosed in U.S. Pat. No. 5,405,091 (Brandt et al.); U.S. Pat. No. 5,106,710 (Wang et al.); U.S. Pat. No. 5,262,259 (Chou et al.); and U.S. Pat. No. 5,071,728 (Watts); the disclosures of which are incorporated by reference herein, can be suitable for use in the present invention.

Preferably, the substrate resists deleterious effects of exterior signing environments including large ambient temperature ranges −60° C. to +107° C., direct exposure to sun and is also conformable for fixing to exterior surfaces wherein it may be adhered over surfaces with some compound curvature or non uniformity, e.g. walls or surfaces with screw heads or rivets slightly proud of the surface without easily ripping the material or "tenting". However, in some aspects of the invention, the substrate need not be limited to these durable, conformable substrates. A less durable plastic is useful for interior signing applications.

Substrates can be clear, translucent, or opaque depending on the application of the invention. Opaque substrates are useful for viewing an image from the image side of the printed sheet in lighting conditions such as trtificial lighting or sunlight. Translucent substrates are particularly useful for backlit usages, for example, a luminous sign.

Substrates useful in the practice of the present invention are commercially available and many are designed to be exterior durable, which is preferred. Nonlimiting examples of such substrates include Scotchcal™ Marking Films and Scotchcal™ Series 9000 Short-Term Removable (STR) Film available from 3M Company, Avery™ GL™ Series Long Life Films, Avery™ XL™ Series Long Life Films, Avery™ SX™ Series Long Life Films, suitable films from the FasCal™ or FasFlex™ range of films or any other suitable marking, graphic or promotional films available from Fasson, Avery or Meyercord. However, other manufacturers of suitable materials exist and the invention shall not be limited to the above. Almost any material composed of a plastic sheet could be used depending on the use of the final image, for example, whether outdoor durability is required, and providing that the conductive layer can adhere to the film surface sufficiently well.

Useful substrates can have a variety of surface finishes such a matte finish as provided with Scotchcal™ Series 9000 Short-Term Removable (STR) Film or glossy finish as provided with Scotchcal™ 3650 Marking Film. Plastic films can be extruded, calendared or cast different plastic materials may be used, such as those exemplified by the Scotchcal™ plasticized poly(vinyl chloride) or Surlyn, an ionomer. Any suitable plastic material can be employed. Nonlimiting examples include polyester materials exemplified by Mylar™ available from E.I. Du Pont de Nemours & Company, Melinex™ available from Imperial Chemicals, Inc., and Celanar™ available from Celanese Corporation. Preferred materials for substrates can include those that are plasticized poly(vinyl chloride)s or ionomers although the invention is not limited to these. Preferred materials are white opaque or translucent materials but transparent materials and colored opaque, translucent or transparent materials could be useful in special applications.

Typical thicknesses of the substrate are in the range of 0.05 to 0.75 mm. However, the thickness can be outside this range and almost any thickness can be useful provided the film resists tearing or splitting during the printing and application process. Given all considerations, any thickness is useful provided the substrate is not too thick to feed into an electrostatic printer of choice.

Conductive Layer

For electrostatic imaging on substrate, a conductive coating layer is provided from an organic solvent-based conductive coating solution on the upper major surface of film substrate. Any materials disclosed in U.S. Pat. No. 5,405,091 (Brandt et al.); U.S. Pat. No. 5,106,710 (Wang et al.); U.S. Pat. No. 5,262,259 (Chou et al.); and U.S. Pat. No. 5,071,728 (Watts) can be suitable for use as a conductive layer in the present invention.

Furthermore, conductive coating solutions employing organic solvents are used to assure that the conductive layer has good ply adhesion. Organic solvents in the conductive coating solutions permit the substrate to avoid any priming of its upper major surface to receive the conductive layer. Better wettability can be achieved on an unprimed substrate, to avoid foaming caused by aqueous based coating solutions.

The conductive coating layer can be electronically conductive or ionically conductive. Electronically conductive layers employ a plurality of particles of a transparent, electrically conductive material such as antimony doped tin oxide or the like, disposed in a polymeric matrix.

Attributes of conductive layer include adhesion to the substrate, deposition using a suitable solvent system, and moisture insensitivity after the layer is dried on substrate.

When an electrically conductive layer is desired, conductive layer is prepared from a solution of a conductive formulation that generally comprises a binder, conductive pigments, dispersant, and organic-based solvent, the latter of which is removed during the manufacturing process.

The weight percent of solids to organic solvent in the conductive formulation can range from about 10 to about 40, with about 25 weight percent being presently preferred for ease of application to film substrate 12.

After coating of conductive formulation on film substrate and evaporation or other removal of organic solvent, the thickness or caliper of the conductive layer can range from about 2 to about 5 μm with about 3 μm being presently preferred.

As stated above, the conductive layer should have a surface resistance ranging from about 0.2 to about 3 megaohms per square. This level of surface resistance provides the proper level of conductivity to form the ground plane for the direct print film of the present invention.

Non-limiting examples of binders include acrylics, polyester, and vinyl binders. Among acrylic binders, carboxylated acrylate binders and hydroxylated acrylate binders are useful for the present invention, such as those commercially available from Allied Colloids of Suffolk, Va. such as "Surcol SP2" carboxylated acrylate binder and "Surcol SP5 hydroxylated acrylate binder. Among some of the polyesters materials which can be employed as binders are materials sold by Goodyear of Akron, Ohio under the brand "Vitel", of which grades PE222 and PE200 are particularly suitable for use in the present invention. Also vinyl resins such as "UCAR" "VAGD" brand resins from Union Carbide of Danbury, Connecticut can also be useful.

Conductive pigments can include antimony-containing tin oxide pigments or other pigments such as indium doped tin oxide, cadmium stannate, zinc oxides, and the like.

Non-limiting examples of antimony-containing tin oxide conductive pigments include those pigments disclosed in U.S. Pat. No. 5,192,613 (Work, III et al.); U.S. Pat. No. 4,431,764 (Yoshizumi); U.S. Pat. No. 4,965,137 (Ruf); U.S. Pat. No. 5,269,970 (Ruf et al.); and in product literature for "Tego S" pigments commercially available from Goldschmidt AG of Essen, Federal Republic of Germany and "Zelec" pigments commercially available from DuPont of Wilmington, Del. When the Goldschmidt Tego S conductive pigment is employed, its particle size should be reduced by a milling process.

Particle size of the conductive pigments in the conductive layer 14 can range from about 0.02 to about 10 μm. Below about 0.02 μm particle size, the conductive pigment is too easily imbibed with solvent action, whereas at greater than 10 μm, the coating of dielectric layer 16 on the conductive layer 14 limits protrusion of the conductive pigment particles into the dielectric layer 16.

Preferably, the average particle size can range from about 0.5 μm to about 4 μm, with particles of about 1 μm being most preferred.

The bulk powder resistivity can range from about 2 to about 15 Ohm-cm with about 2 to about 10 Ohm-cm being preferred and about 6 to about 7 Ohm-cm being presently preferred. With the DuPont pigments, the bulk powder resistivity can be about 2–5 Ohm-cm for "Zelec 3410-T" pigments and 4–15 Ohm-cm for "Zelec 2610-S" found acceptable for the present invention. The bulk powder resisitivity has been found to be important in controlling the final appearance of the image on the direct print film because materials that are too resistive require the use of a larger amount of conductive pigment can cause an objectionable amount of background color in the final image.

The "Tego S" particles are identified to have a specific resistance of 10, which is believed to compute to about bulk powder resistivity of about 10.

The present invention preferably uses antimony-containing pigments which have antimony intimately mixed with tin oxide, that is, present in the form of an antimony and tin oxide coating on silicon containing particles (believed to be typified by the DuPont materials and disclosed in the Work III, et al. patent identified above) or in the form of antimony doped through a lattice of tin oxide particles (believed to be typified by the Tego materials and disclosed in the Ruf and Ruf et al. patents identified above), as compared with antimony—tin oxide reacted materials (believed to be typified by the Mitsubishi materials described in Yoshizumi patent identified above). While not being limited to a particular theory, better bulk powder resistivity within the acceptable range is achieved by antimony and tin oxide coatings or antimony doped into tin oxide lattices that create "intimately mixed" antimony with tin oxide, as opposed to particles of antimony reacted with tin oxide.

A variety of surfactant materials can be employed as dispersants for the conductive layer in the present invention, including nonionic and anionic dispersants. In general, anionic dispersants are most preferred, although the invention is not limited thereto. One particularly preferred anionic dispersant is a material branded "Lactimon" dispersant from BYK-Chemie USA Corporation of Wallingford, Conn. Also commercially available from BYK-Chemie USA Corporation is a nonionic dispersant is branded "Anti Terra U" dispersant.

Non-limiting examples of solvents for the conductive formulation include ethyl acetate and ethanol.

Formulations of the conductive layer 14 require a weight ratio from about 5:1 to about 1:1 of pigment:binder with a preference of a weight ratio of 3:1 pigment:binder. When "Tego S" conductive pigment is employed, the weight ratio can range from about 3.0:1 to about 4.7:1 pigment:binder. When the DuPont "Zelec" conductive pigment is employed, the weight ratio can range from about 1:1 to about 4:1 pigment:binder.

When the pigment to binder ratio falls below 1:1, there is inadequate bulk conductivity of layer. When the weight ratio of pigment:binder exceeds about 5:1, there is insufficient cohesive strength of the layer 14 on film substrate 12.

Dielectric Layer

Dielectric layer can be coated on conductive layer to provide the electrostatic capacitance required for electrostatic imaging.

The dielectric layer is of relatively high electrical resistivity and contributes to the performance of substrate for printing of images electrostatically. In addition to providing the interface of the substrate with the recording head and toner, dielectric layer covers and protects conductive layer.

In one embodiment, the surface release layer provides the top surface according to the teachings of U.S. Pat. No. 5,262,259 (Chou et al.) For example, the release surface may be substantially adhered to or fixed to the underlying substrate of the temporary image receptor, such as commercially available as Scotchprint™ brand No. 8603 Electrostatic Imaging Media commercially available from Minnesota Mining and Manufacturing Company of St. Paul, Minn., USA.

Alternatively, the dielectric layer layer may be the top surface and is substantially non-adhered to the underlying substrate of the temporary image receptor. The function of this sacrificial release layer in a transfer to the final receptor can become a protective layer, such as disclosed in U.S. Pat. No. 5,397,634 (Cahill) and as is used in Scotchprint™ brand No. 8603 Electrostatic Imaging Media commercially available from Minnesota Mining and Manufacturing Company of St. Paul, Minn.

A variety of imaging defects can be attributed to incorrect properties of a dielectric layer in electrostatic or electrographic imaging processes. Dielectric layer is constructed to minimize imaging defects. Some of the noted defects include image flare, which results from unwanted electrostatic discharge within the recording medium; image drop out, which occurs when a portion of the image is not printed onto the medium; and shorting between nibs on the imaging head because the head is not kept sufficiently clean by a dielectric layer of passing recording medium past the nibs over time.

Dielectric layer is coated on layer from a dielectric formulation that comprises particulate matter of both spacer particles and abrasive particles, preferably in particular ratios dispersed in a binder.

Both the spacer particles and the abrasive particles should be selected with consideration to the refractive index thereof, so as to provide index matching to the remainder of dielectric layer and substrate. In this manner, substrate has a uniform appearance. This is especially so when transparent products are desired. In the case of opaque products, a uniform appearance would not be critical.

The spacer particles can be fabricated from a material having sufficient rigidity to withstand coating and handling, but need not be highly abrasive. Nonlimiting examples of materials useful as spacer particles include relatively soft materials such as a polymer or a mineral such calcium carbonate or relatively hard materials such as silica or glass, provided that such relatively hard materials have a relatively rounded configuration. More particularly, useful spacer particles can be made from synthetic silicas, glass micro beads, natural minerals (e.g., calcium carbonate), polymeric materials such as polypropylene, polycarbonate, fluorocarbons or the like.

Typically spacer particles have an average size ranging from about 1 to about 15 $\mu$m, and preferably below about 10 $\mu$m. In general, spacer particles will be present in a distribution of sizes, although it is most preferred that the particles remain in a size range of about 3–10 $\mu$m.

One particularly preferred group of spacer particle materials comprise amorphous silica, of which is most preferred the synthetic, amorphous silicas sold by the W.R. Grace Corporation under the brand "Syloid 74". These materials havean average particle size of approximately 3.5–7.5 $\mu$m as measured on a Coulter apparatus and an average particle size of 6–10 $\mu$m as measured on a Malvern analyzer. One specific member of this group of materials comprises "Syloid 74 X-Regular" particles which have an average particle size of 6.0 as measured on a Coulter apparatus.

Abrasive particles useful for dielectric layer of the present invention are provided to assure that the performance of spacer particles and abrasive are effectively decoupled so as to provide an optimized dielectric medium.

The abrasive particles will generally be harder than the spacer particle material chosen and will usually have a more irregular configuration or texture than the spacer particle material. Among some of the preferred abrasive materials are silica materials such as microcrystalline silica and other nined or processed silicas, as well as other abrasives such as carbides and the like.

The abrasive particles generally have the same size range as the spacer particles, typically in the range of about 1 to about 15 $\mu$m and preferably less than 10 $\mu$m.

One particularly preferred group of abrasive materials comprises mined, microcrystalline silica sold under the brand "Imsil" by Unimin Specialty Minerals, Inc. of Elko, Ill. These materials comprise 98.9% silica with minor amounts of metal oxides. One grade having particular utility comprises "Imsil A-10" which has a median particle size of 2.2 $\mu$m, and range of particle sizes such that 99% of the particles have a size less than 10 $\mu$m and 76% of the particles have a size of less than 5 $\mu$m.

The proportion of spacer particles to abrasive particles are such that the spacer particles are present in a larger amount. Preferably, the ratios of spacer to abrasive particles fall within the range of about 1.5:1 to about 5:1. Most preferably, the ratio of spacer to abrasive particles is approximately 3:1.

The spacer particles and abrasive particles are disposed is a binder which generally comprises a polymeric resin. The resin should be of fairly high electrical resistivity, and should be compatible with both types of particles and the toner. The resin should have sufficient durability and flexibility to permit it to function in the electrostatic imaging process and should be stable in ambient atmospheric conditions.

There are large number of resins that meet these criteria. One preferred group of materials are the acrylic copolymers of the type commercially available from Rohm and Haas of Philadelphia, Pennsylvania under the brand "Desograph-E342-R".

A coating mixture to prepare dielectric layer 16 can employ solvents such toluene into which the binder, spacer particles, and abrasive particles can be added as solids. The range of total solids in the coating mixture can be from 10 to about 35 and preferably about 15 to 25 weight percent of the total coaling mixture. Of the total solids, the binder solids can comprise from about 93 to about 78 and preferably 82 weight percent. Of the total solids, the particles solids (preferably in a 3:1 spacer:abrasive mixture) can comprise from about 7 to about 22 and preferably 18 weight percent.

The particle solids for the coating mixture can be blended by ball milling for approximately two hours at room temperature. Under these conditions, there is no significant reduction in particle morphology, and the ball milling process only serves to mix and disperse the particles. Other processes could be employed.

Surface roughness is desired to provide topography for deposition of toner particles is based on a Sheffield method measurement described in TAPPI Test T 538 om-88 published by the Technical Association of the Pulp and Paper Industry of Atlanta, Georgia, incorporated herein by reference.

The dielectric layer can have a surface roughness ranging from about 50 to about 200 Sheffield units and preferably from about 80 to about 180 with 140 being presently preferred. The dielectric substrates of this invention comprise a dielectric layer, optional interlayers, such as barrier layers, priming layers, and charge blocking layers, and a textured release layer. The dielectric substrate may be of any known sheet member for insertion into any of the the electrostatic printers mentioned above.

Dielectric layers are also commercially available as papers and films from such companies as Rexam of Charlotte, N.C., USA; Wausau Paper of Wausau, Wis., USA; and Azon Corporation of Johnson City, N.Y., USA.

Surface Release Layers

1. Chemical Composition of Surface Release Layer

The release layer may be comprised of any release material known to be useful in dielectric substrates. Examples of such materials include silicone or fluorosilicone polymers (such as ethylenically unsaturated-, hydroxy-, epoxy-terminated or pendant functional silicone pre-polymers); or other release polymers with suitable low surface energy [such as poly(organosiloxanes), condensation cure silicones, and the like].

One preferred release material is the crosslinked silicone polymer disclosed in PCT Patent Publication WO96/34318 incorporated herein by reference. These polymers comprise the reaction product of the components comprising:

A) 35 to 80 parts by weight of a siloxane polymer with a high content of functional groups capable of crosslinking having the repeating unit:

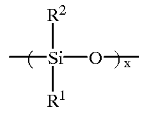

where each $R^1$ independently is an alkyl group, aryl group, or alkenyl group, $R^2$ is, independently for each group —$SiR^1R^2O$— either an alkyl group, an aryl group, or a functional group capable of cross-linking and at least 3% of $R^2$ are functional groups capable of crosslinking, and x is an integer greater than 0;

B) greater than 0 and less than or equal to 50 parts by weight of a siloxane polymer with a low content of functional groups capable of crosslinking having the repeating unit

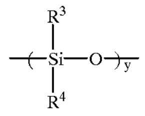

where each $R^4$ independently is an alkyl group, aryl group, or alkenyl group, $R^3$ is, independently for each group —$SiR^3R^4O$— either an alkyl group, an aryl group or a functional group capable of cross-linking and no more than 2.5% of $R^3$ are functional groups capable of cross-linking, and y is an integer of at least 50; and, optionally, C) 5 to 30 parts by weight of a cross-linking agent having the repeating unit

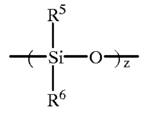

wherein each $R^5$ independently is hydrogen, an alkyl group, or an aryl group, $R^6$ is, independently for each group —$Si^5R^6O$— either an alkyl group, an aryl group or a functional group capable of cross-linking and from 25 to 100% of $R^6$ are functional groups capable of cross-linking, z is an integer from 0 to 1000, and there are at least two functional groups capable of cross-linking per molecule.

"Functional groups capable of crosslinking" means groups which may undergo free radical reactions, condensation reactions, hydrosilylation addition reactions, hydrosilane/silanol reactions, or photoinitiated reactions relying on the activation of an intermediate to induce subsequent cross-linking.

Optionally, the above materials may be modified by the addition of silicate resins. Nonlimiting examples of silicate resins include Dow Corning 7615 (Dow Corning, Midland, Mich.), Gelest vinyl Q resin VQM-135 and VQM-146 (Gelest, Tullytown, Pa.). See Copending U.S. Application bearing Attorney Docket No. 53267USA7A.

If fillers are to be added to the chemical composition, nonlimiting examples of fillers include hydrophobic fumed silica such as CAB-O-SIL™ TS530, TS610 and TS720 (both from Cabot Corp. of Billerica, Mass.) and AEROSIL™ R972 (from Degussa Corp). A non-limiting list of low surface energy fillers includes polymethylmethacrylate beads, polystyrene beads, silicone rubber particles, teflon particles, and acrylic particles. Other particulate fillers which can be used but which are higher surface energy include but are not limited to silica (not hydrophobically modified), titanium dioxide, zinc oxide, iron oxide, alumina, vanadium pentoxide, indium oxide, tin oxide, and antimony doped tin oxide. High surface energy particles that have been treated to lower the surface energy are useful. The preferred inorganic particles include fumed, precipitated or finely divided silicas. More preferred inorganic particles include colloidal silicas known under the tradenames of CAB-O-SIL™ (available from Cabot) and AEROSIL™ (available from Degussa). Suitable low surface energy inorganic fillers include surface treated colloidal silica fillers such as CAB-O-SIL™ TS-530 and TS-720, Degussa R812, R812S, R972, R202. CAB-O-SIL™ TS-530 is a high purity treated fumed silica which has been treated with hexamethyldisilazane (HMDZ). CAB-O-SIL™ TS-720 treated fumed silica is a high purity silica which has been treated with a dimethyl silicone fluid. CAB-O-SIL™ TS610 is a high purity fumed silica treated with dimethyldichlorosilane.

Non-conductive fillers are preferred. When conductive fillers are used, the electrical characteristics of the dielectric assembly must be considered in order to avoid adverse effects due to lateral conductivity.

The composition of the filler is preferably 0.1 to 20%, more preferably 0.5 to 10% most preferably 1 to 5% w/w based on weight of release layer composition excluding solvents.

According to one preferred embodiment, the release layers are applied using solventless coating methods. In that case, silicone pre-polymers having number average molecular weights from approximately 500–30,000, preferably 1000–25,000, more preferably 10,000–20,000 Da, are useful. Optionally the pre-polymers may be used in combination with higher molecular weight silicones. Such higher molecular weight silicones can have number average molecular weights less than 800,000 Da, preferably less than 600,000 Da, and most preferably less than 500,000 Da.

The release layers are preferably somewhat crosslinked. The pre-polymers may be prepared in a range of potential crosslinking density afforded by the presence or absence of pendant crosslinkable groups in addition to crosslinkable terminal groups. The mole percent of crosslinkable groups was preferably 0 to 25 mole %, more preferably 1–15 mole % and most preferably 4–10 mole %. Both vinyl and higher alkenyl (number of carbons greater than 2 and less than 10) crosslinking groups may be used. The distribution of crosslinks in the crosslinked polymer may be monomoldal, bimodal or multimodal.

Additional components may be used in combination with the base polymers to improve the durability or imaging performance of the temporary image receptor. Some chemical release modifiers include silicate resins, high molecular weight crosslinkable silicones, and optionally, low surface energy fillers.

Nonlimiting examples of the high molecular weight crosslinkable silicones include ethylenically unsaturated organopolysiloxanes ranging in number average molecular weights from 62,000 to 160,000 Da available from Crelest, Tulleytown, Pa. (DMS-41, DMS-46, DMS-52) or those described in U.S. Pat. No. 5,468,815 and in European Patent Publication 0 559 575 A1 (the disclosures of which are incorporated by reference herein). Preferably, alkenyl-functional silicones having from about 2 to about 10 carbon atoms are used.

Temporary image receptors have been prepared by adding hydrophobic fumed silica fillers to a variety of release formulations having higher alkenyl (e.g., hexenyl) functional silicones with crosslink densities corresponding to percent swelling in toner carrier liquid ranging from about 10% swelling ("low") to about 40% swelling ("medium") to about 100% swelling ("high") by weight.

As curing catalysts, both thermal and ultraviolet ("UV") initiated catalysts can be used in the formation of release surfaces of the present invention. Nonlimiting examples of platinum thermal catalysts are Dow Corning (Midland, Mich.) Syloff 4000 and Gelest platinum-divinyltetramethyldisiloxane complex (SIP6830.0 and SIP6831.0). A nonlimiting example of a platinum UV catalyst is disclosed in U.S. Pat. No. 4,510,094 (Drahnak). The UV catalyst does not require an additional inhibitor since the complex is effectively inhibited until exposure to UV.

A nonlimiting list of silyl hydride crosslinkers include Dow Corning as homopolymers (Syl-Off™ 7048), copolymers (Syl-Off™ 7678) and mixtures (Syl-Off™ 7488). Crosslinker in the amounts corresponding to 1:1 to 10:1 silyl hydride:vinyl ratio may be used in combination with an inhibitor such as fumarate in benzyl alcohol (FBA) in the base pre-polymer to achieve good cure and adequate pot life in 100% solids coating dispersion with a thermal catalyst. In solvent coated formulations the inhibitor is not required.

2. Thickness

A release layer is a dielectric material and its thickness could affect imaging performance in electrographic imaging processes. Furthermore, the durability of the release will depend on the thickness of the release. A thicker layer as indicated is necessary to provide a mechanically durable dielectric substrate when a swellable polymer is used as a primary component of the release layer. Durability is particularly important when transfer of the image from the photoconductor element to the image receiver is accomplished primarily by heat and pressure and without electrostatic assist because the heat and pressure can be very harsh on the surface layer of the photoconductor element. In addition, the thickness of a textured release surface may vary periodically or in a random fashion; in such cases, the thickness of the release surface is defined as the root mean square thickness averaged over the receptor surface. The thickness of the release layer is preferably less than 5 microns, more preferably 0.4 to 3 microns, and most preferably 0.5 to 1.5 microns.

3. Surface Roughness

The release layers of this invention preferably have a directionalized texture. The preferred magnitude of the roughness of this texture is an Ra>10 nm and<5000 nm, more preferably an Ra>500 nm and <2500 nm. According to another embodiment the texture may be defined by-a lateral surface roughness of between about 0.1 and 1000 microns and a vertical surface roughness between about 0.01 and 5 microns.

Suitable methods of preparing surface release layers on temporary image receptors include various precision coating methods known in the art. A non-limiting list of such methods includes dip coating, ring coating, die coating, roll coating, flexographic printing, gravure coating, Lanugmuir-Blodgett bath coating and carrier fluid coating methods as described in copending, coassigned, U.S. patent application Ser. No. 08/826,571 incorporated herein by reference and the like. Either solventless or solvent-based coating formulations may be used. Die coating, gravure coating, flexographic printing, Langmuir Blodgett bath coating and carrier fluid coating methods provide the advantage of allowing one to impart texture during the coating process.

For solvent-based coating, the solvent must dissolve the release prepolymers and additives yet not attack the underlying layers. This disadvantage is overcome by use of solventless coating. Suitable solventless release formulations can be prepared using vinyl and alkenyl silicone pre-polymers and higher viscosity, lower mole % functionalized silicone polymers. These solventless release formulations have been rotogravure coated at thicknesses of 0.1–2 micrometers and using water carrier coating method (as described in WO 96/23595 and copending, coassigned, U.S. patent application Ser. No. 08/826,571, both incorporated herein by reference) coated at 0.65 micrometers calculated thickness to yield high quality dielectric substrate release surfaces.

Surface release coatings are typically thermally cured after coating in order to improve release layer durability and promote adhesion to the underlying substrate which forms the temporary image receptor. In addition to or in place of thermal cure methods, the release formulations may also be cured using radiation such as ultraviolet lamps, excimer lasers, electron beams, etc.

Various means may be used for producing a textured release surface according to the present invention. Various coating processes may be operated in a manner so as to obtain non-levelled coating "defects" which are permanently incorporated into the surface of the dielectric substrate after drying or curing of the surface release layer. Surface textures made in this way may have random or periodic patterns, or have directionality.

The aforementioned coating processes may be utilized to achieve both repeated geometric patterns and random or irregular patterns in release surfaces without the use of fillers. In particular, a non-levelled gravure pattern has been found to have utility in the present invention. Such a pattern can be created when the applicator roll separates from the newly applied coating during a rotogravure coating process. The gravure patterns on the release surface may be controlled by appropriate choice of gravure cell design (pyramidal, etc.), roller speeds, gravure coating method (offset vs. direct, reverse vs. forward, and microgravure), and viscosity/rheology of the formulation.

Textured release surfaces can also be obtained by operating a conventional multi-roller coater using smooth rolls in a manner in which a periodic hydrodynamic instability is observed on the surface of the applied coating. Such coating instabilities, known in the art as "ribbing" instabilities if the periodic pattern repeats across the web and as "cascade" or "seashore" instabilities if the periodic pattern repeats down web, are described in detail in E. Cohen and E. Gutoff, *Modern Coating and Drying Technology*, (VCH Press: NY, 1992), pp. 79–94.

The peak to valley height and the periodicity of such coating instabilities can be controlled by manipulating the Capillary number and the coating gap/roller diameter ratio (in forward roll coating) or the relative roll speed ratios and the Capillary number (in reverse roll coating), as described in the above reference by Cohen and Gutoff at pp. 131–133. The Capillary number, which depends upon the relative web speed (v) as well as the viscosity ($\eta$) and surface tension ($\sigma$) of the coating formulation, is given by:

$$Ca=v\eta/\sigma$$

Periodic surface patterns (i.e. ribs) can also be obtained from non-levelled coating instabilities created by extrusion die coating release formulations in an unstable operating regime as described in Cohen and Gutoff (p. 162). Non-levelled surface patterns can also be obtained using fluid carrier coating processes as described in copending, coassigned Butler et al. application by choice of formulation (viscosity, relative hydrophilicity, surface tension, surface active agents, etc.), coating thickness, temperature, and the like.

Other means for applying a non-levelled surface coating may also lead to a patterned or textured release surface as described herein. For example, screen printing, spray coating, or flexographic printing techniques could all be operated in a mode which produces a non-levelled surface pattern.

Patterns can also be generated on the release surface using post-coating methods such as embossing, application of patterning rolls under conditions of pressure and/or heat, abrading or sanding rolls, and microreplicated tools.

Patterned webs (rather than patterned rolls) can also be used. A coating overlayer could be applied to a patterned web to modulate the degree of roughness. A patterning layer might be laminated to the web of interest. The inventors also envision the use of a microreplicated tool which can be filled with the coating formulation, doctored, and transferred to a web where it is cured.

Patterning processes such as these have great utility in that they are capable of generating reproducible patterns continuously or semi-continuously. Some of these methods may also be used in discrete patterning processes.

4. Surface Energy

The surface energy for release layers should be selected to be appropriate relative to other surfaces in the system. The surface energy of the release is preferably less than 28 dynes/cm, more preferably less than 26 dynes/cm, and most preferably less than 24 dynes/cm.

5. Coefficient of Friction

As discussed above textured release formulations can be prepared using alkenyl silicone pre-polymers and high molecular weight organopolysiloxanes. When prepared by solvent-free coating methods, these formulations typically yield densely crosslinked, rubbery, slip-resistant coatings.

The traditional solvent-based release formulations therefore have a much more slippery surface texture, exhibiting typical coefficient of friction ("C.O.F.") of 0.05 compared to values of 0.4 or higher for solvent-free release formulations. The addition of a low weight percent of a high molecular weight gum can potentially be used with the solvent free systems to lower the coefficient of friction while maintaining the high crosslinking density. As disclosed in U.S. Pat. Nos. 5,468,815 and 5,520,987, the effectiveness of the gum in lowering the C.O.F. is a function of the specific functionality and molecular weight of the additive. By using commercially available solvent-free base silicones and/or C.O.F. modifying gums in a dielectric substrate release, both the durability and printing performance of the temporary image receptor are unexpectedly improved.

Materials and Methods

Silicone polymers were obtained commercially or prepared by methods known in the art. Table 1 summarizes silicone pre-polymers used in the examples, which include hexenyl functional organopolysiloxanes prepared according to Keryk et al, U.S. Pat. No. 4,609,574 and Boardman et al. U.S. Pat. No. 5,520,978 and vinyl functional organopolysiloxanes obtained from Gelest (VDT-731; Tullytown, Pa.) or prepared according to methods known in the art, as disclosed in McGrath, J. E. and I. Yilgor, Adv. Polymer Science, Vol. 86, p. 1, 1989; Ashby, U.S. Pat. No. 3,159,662; Lamoreaux, U.S. Pat. No. 3,220,972; Joy, U.S. Pat. No. 3,410,886. The mole percent of crosslinkable groups varied between 1–10% in the pre-polymer. The number average molecular weight of the pre-polymers ranged from approximately 5000–150,000 Da, with the lower molecular weights corresponding to useful viscosity ranges for solventless coating methods. In addition to silicone pre-polymers, high molecular weight silicone gums were used as additives, as described in Table 1. Hexenyl functional silicone gums were prepared according to Boardman et al. U.S. Pat. No. 5,520,978. Vinyl functional silicone gums were obtained commercially from Gelest (DMS-V41 and DMS-V52) or prepared according to McGrath, J. E. and I. Yilgor, Adv. Polymer Science, Vol. 86, p. 1, 1989; Ashby, U.S. Pat. No. 3,159,662; Lamoreaux, U.S. Pat. No. 3,220,972; Joy, U.S. Pat. No. 3,410,886. The mole percent of crosslinkable groups was less than 1%, due to the absence of pendant functionality.

Catalysts included Dow Coming platinum thermal catalyst, Syl-Off TM 4000 (Midland, Mich.), and an ultraviolet initiated platinum catalyst prepared according to Dranak, U.S. Pat. No. 4,510,094. Homopolymer and/or copolymer hydride crosslinkers such as Dow Corning Syl-Off TM 7048, Syl-Off TM 7678, and Syl-Off TM 7488 and NM203 from United Chemical Technology (Piscataway, N.J.) were used at silyl hydride to vinyl ratios of 1:1 to 5:1. In order to obtain adequate pot life in solventless (i.e., 100% solids) silicone formulations, 2.40% (w/w) of a 70:30 mixture by weight of diethyl fumarate and benzyl alcohol (FBA) was added as an inhibitor or bath life extender as taught in U.S. Pat. Nos. 4,774,111 and 5,036,117. No inhibitor was used for solvent coated mixtures due to the low percent solids in the dispersion.

Materials were evaluated for performance in the presence and absence of chemical modifiers. In addition to the silicone gums described in Table 1, particulate fillers and silicate resins were used. Fillers included hydrophobic fumed silica such as Cab-O-SilTM (Billerica, Mass.) TS720 and hexamethyldisilazane (HMDZ) in-situ treated silica. Silicate resins included Dow Coming 7615 and Gelest vinyl Q resins, VQM-135 and VQM-146. These were obtained as dispersions of silicate in silicone. Dow Corning 7615, for example, is a 50% dispersion of silicate resin in silicone.

TABLE 1

Summary of Material Set

| Component | Description (crosslinking functionality) | mole % alkenyl | Viscosity | Mn (daltons) |
|---|---|---|---|---|
| PRE-POLYMERS | | | | |
| I | hexenyl pendant and terminated | 2.7 | 450 mPas | 9610 |

TABLE 1-continued

Summary of Material Set

| Component | Description (crosslinking functionality) | mole % alkenyl | Viscosity | Mn (daltons) |
|---|---|---|---|---|
| II | hexenyl terminated only | 1 | 450 mPas | 12,400 |
| III | hexenyl terminated only | 2 | 450 mPas | 6530 |
| IV | hexenyl pendant and terminated | 3.5 | 450 mPas | 6720 |
| V | hexenyl pendant and terminated | 4 | 450 mPas | 9800 |
| Gelest VDT-731 | vinyl pendant | 7.5 | 1000 mPas | 28,000 |
| VI | vinyl pendant, trimethylsiloxyl terminated | 9.2 mPas | 275,000 | 55,200 |
| VII | vinyl pendant and terminated 3% HMDZ silica | 10 mPas | 1000 | |
| VII | vinyl pendant and terminated | 10 | 1000 mPas | |
| GUM | | | | |
| IX | hexenyl termina- | 0.033 | | 440,000 |
| X | ted vinyl pendant | 0.2 | 100 Williams plasticity | |
| XI | vinyl terminated | 0.03 | 400,000 | |
| Gelest DMS-V41 | vinyl terminated | 0.10 | 10,000 | 62,700 |
| Gelest DMS-V52 | vinyl terminated | 0.035 | 165.000 | 155,000 |

Solvent-based Release Formulations

A representative solvent-based release formulation was prepared as follows. A 18 g mixture of silicone pre-polymer, crosslinker and chemical modifier (gum, hydrophobic silica, silicate resin, etc.), was prepared as described in Table 2 and diluted with 221.86 g heptane to form Stock A. Stock B (containing platinum thermal catalyst) was then prepared by mixing 0.41 g of Dow Coming Syl-Off™ 4000 with 6.00 g heptane. A 5.63 g sample of Stock B was then added to Stock A. This sample was die coated as described below.

Solventless Release Formulations

Release formulations were also prepared at 100% solids. These formulations were precision coated without the use of solvent using gravure coating methods described below.

For the solventless coating formulations, Stock C differed from Stock A above in that it contained the platinum catalyst, a FBA inhibitor, and lacked the crosslinker. A fully reactive system was prepared just prior to coating by the addition of Stock D containing the crosslinker. Examples of these formulations are described in Table 3.

TABLE 2

Example Preparation for Solvent Coating of Release for Temporary Image Receptor

| Components | Final Concentration (relative to base polymer) | Amount (g) |
|---|---|---|
| Stock A | | |
| Silicone pre-polymer V | — | 15.00 |
| Syl-Off ™ 7048 | 5:1 silyl hydride:vinyl | 2.46 |
| Gum IX | 2% w/w | 0.3 |
| Cab-O-Sil ™TM TS720 | 1% w/w | 0.15 |
| Heptane | 6.3% solids | 221.86 |
| Stock B | | |

TABLE 2-continued

Example Preparation for Solvent Coating of Release for Temporary Image Receptor

| Components | Final Concentration (relative to base polymer) | Amount (g) |
|---|---|---|
| Syl-Off ™ 4000 | 333 ppm | 0.41 |
| Heptane | — | 6.00 |

TABLE 3

Example Preparation for Solventless Coating of Release Formulations for Temporary Image Receptor

| Components | Final Concentration (relative to base polymer) | Amount (g) |
|---|---|---|
| Stock C | | |
| Silicone pre-polymer V | — | 808.5 |
| Gum IX | 2% w/w | 16.50 |
| Cab-O-Sil ™ TS720 | 1% w/w | 8.25 |
| Syl-Off ™ 4000 | 125 ppm | 19.83 |
| FBA Inhibitor | 2.4% w/w | 19.80 |
| Stock D | | |
| Syl-Off ™ 7048 | 5:1 silyl hydride:vinyl | 135.12 |

Print Quality Evaluation for Electrostatic Imaging

A 3M Scotchprint™ Model 9510 Electrostatic Printer (as described in U.S. Pat. No. 5,262,259) was modified to accommodate a 30 cm wide web, and used 10 to print on release coated temporary image receptors. Standard Scotcliprint™ toners were used to image onto coated 3M Scotchprint™ Electronic Imaging Paper (8610). Optical density was compared to a control, which consisted of uncoated Scotchprint™ 8610 imaging paper. Transfer efficiency was rated relative to a control consisting of Scotchprint™ 8601 image transfer media. The images were transferred to Scotchprint™ 8620 receptor media using a 3M Scotchprint™ Model 9540 Laminator with a heated top roll, as described in U.S. Pat. No. 5,114,520. The printer and laminator settings are summarized in Table 4.

TABLE 4

Experimental Parameters for 3M Scotchprint ™ Model 9510 Electrostatic Printer and Model 9540 Laminator

| CONFIGURATION | SETTING |
|---|---|
| Printer | |
| Nib Voltage (V) | 275 |
| Plate settings (V); | |
| black | 255 |
| cyan | 150 |
| yellow | 150 |
| magenta | 255 |
| Laminator | |
| Speed (m/min) | 0.61 and 1.8 |
| Pressure (kPa) | 441 |
| Temperature (degrees C) | 96 |

Print quality was evaluated for each formulation. Images produced on the 3M Scotchprint™ Modified Model 9510 Electrostatic Printer were examined for evidence of head scraping, resulting from toner delamination from the release surface and potentially leading to shorting between printing nibs. None of the materials exhibited head scraping.

Transfer was graded by a visual standard method rating system (VSM). The VSM graded the effectiveness of image transfer by a visual inspection of the residual toner left on the transfer medium after transfer and by inspection of the receptor medium for transfer image quality, uniformity of color and presence of defects. Transfer was rated on a scale of 4.0–10.0, with 10.0 representing perfect transfer. A minimum rating of 8.5 was required for acceptable transfer. Transfer efficiency is a function of laminator speed, with 0.46 meters per minute used for standard product transfer. For the purpose of these tests, higher laminator speeds of 0.61 and 1.8 meters per minute were used. Image transfer performance was rated against a 3M Scotchprint™ Electronic Image Transfer Media (8601) which was solvent coated with silicone urea release formulation, as described in U.S. Pat. No. 5,045,391.

As shown in Table 6, the gravure patterned Examples 2.1–2.6 showed significantly enhanced transfer efficiency relative to the Comparative Example 1.0 at both 2 and 6 fpm. Since standard product transfer is currently at 1.5 fpm, this demonstrates the potential of patterned release surfaces for improved laminator throughput. Improved transfer was not achieved at the cost of inferior image adhesion; no image scraping was observed under the conditions of the experiment. As illustrated in Examples 2.1 to 2.6, combination of physically patterning of the release surface with chemically modified release can yield excellent image transfer at elevated speeds.

Reusable release surfaces are therefore possible for extended electrostatic printing, integral release surfaces for combined dielectric and release properties on conductive substrates, and patterned and chemically modified release surfaces of a broad range of release formulations.

The invention is not limited to the above embodiments. The claims follow.

TABLE 5

Raw Materials for Temporary Image Receptors for Electrostatic Imaging

| Example | Base polymer | Crosslinker | Gum | Additive 1 | Additive 2 | Dispersion | Coating process | Parameters |
|---|---|---|---|---|---|---|---|---|
| 1.0 | Scotchprint standard | 8601 (A5033011) | | | | | die coated | |
| 2.1 | Gelest VDT-731 | Dow Corning Syl-Off 7048 | IX | none | none | 100% solids | gravure | |
| 2.2 | Gelest VDT-731 | Dow Corning Syl-Off 7048 | IX | 10% Degussa_R972_ | none | 100% solids | gravure | |
| 2.3 | Gelest VDT-731 | Dow Corning Syl-Off 7048 | IX | 10% Cab-o-Sil TS720 | none | 100% solids | gravure | |
| 2.4 | Gelest VDT-731 Off 7048 | Dow Corning Syl- | IX TS720 | 5% Cab-o-Sil | none | 100% solids | gravure | |
| 2.5 | Dow Corning 7615 silicate resin | Dow Corning Syl-Off 7048 | IX | none | none | 100% solids | gravure | |
| 2.6 | Gelest vinyl Q Resin VQM-135 | Dow Corning Syl-Off 7048 | IX | none | none | 100% solids | gravure | |

TABLE 6

Performance of Patterned Temporary Image Receptors for Electrostatic Imaging

| Example | Roughness, Ra (nm) | Image Transfer 2 fpm | Rating 6 fpm |
|---|---|---|---|
| 1.0 | 670 | 7.5 | 4.0 |
| 2.1 | 1260 | 9.4 | 9.4 |
| 2.2 | 1130 | 9.5 | 9.2 |
| 2.3 | 1050 | 9.5 | 9.2 |
| 2.4 | 1030 | 9.5 | 9.2 |
| 2.5 | 1270 | 9.5 | 9.0 |
| 2.6 | 968 | 9.5 | 9.4 |

The preparation and utility of patterned temporary receptors for electrostatic imaging is examined in Tables 5 and 6. Table 5 lists the raw materials and processes used in the gravure coating of these release materials onto 3M Scotchprint Electronic Imaging Pater (8610). Comparative Example 1.0 is a temporary image receptor paper onto which a silicone urea formulation was solvent coated to give a smooth surface with no discernible pattern outside that imparted by the paper fibers themselves, as shown in micrographs. In constrast, Examples 2.1–2.6 are silicone formulations (shown in Table 4) which were gravure coated onto 3M Scotchprint™ Electronic Imaging Paper (8610) to yield a patterned surface, as supported by the interferometry data in Table 5.

What is claimed is:

1. A dielectric substrate comprising:

a substrate, a conductive layer coated on the substrate, a dielectric layer and a release layer, wherein the dielectric layer is coated on the conductive substrate, wherein the release layer is coated on the dielectric layer and has a texture on the outer surface thereof wherein the texture has a lateral surface roughness of between about 0.1 and 1000 $\mu$m and a vertical surface roughness of between about 0.01 and 5 $\mu$.

2. The dielectric substrate of claim 1 wherein the texture is periodic.

3. The dielectric substrate of claim 1 wherein the texture is non-periodic.

4. The dielectric substrate of claim 1 wherein the texture is defined by an Ra between 10 nm and 5000 nm.

5. The dielectric substrate of claim 1 wherein the texture is defined by an Ra between 500 nm and 2500 nm.

6. The dielectric substrate of claim 1 wherein the texture is provided by a method selected from abrading, buffing, embossing, gravure coating, die coating, roll coating, extrusion coating, carrier fluid coating, Langmuir-Blodgett bath coating and flexographic printing and wherein the texture has a lateral surface roughness of between about 0.1 and 1000 $\mu$m and a vertical surface roughness of between about 0.01 and 5 $\mu$m.

* * * * *